(12) United States Patent
Taketomi

(10) Patent No.: US 11,435,549 B2
(45) Date of Patent: Sep. 6, 2022

(54) DRIVING APPARATUS, OPTICAL APPARATUS, SYSTEM, IMAGE PICKUP APPARATUS, AND LENS APPARATUS

(71) Applicant: CANON KABUSHIKI KAISHA, Tokyo (JP)

(72) Inventor: Yuzo Taketomi, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 695 days.

(21) Appl. No.: 16/365,146

(22) Filed: Mar. 26, 2019

(65) Prior Publication Data

US 2019/0302401 A1    Oct. 3, 2019

(30) Foreign Application Priority Data

Mar. 30, 2018 (JP) .............................. JP2018-069284

(51) Int. Cl.
*H04N 5/225* (2006.01)
*G02B 7/10* (2021.01)

(52) U.S. Cl.
CPC ........... *G02B 7/102* (2013.01); *H04N 5/2254* (2013.01)

(58) Field of Classification Search
CPC ......... G02B 7/102; G02B 7/08; H04N 5/2254
See application file for complete search history.

(56) References Cited

U.S. PATENT DOCUMENTS 8,576,504 B2 * 11/2013 Akada ................. H02P 6/16
359/824

FOREIGN PATENT DOCUMENTS

JP        2006-189506 A    7/2006

* cited by examiner

*Primary Examiner* — Alicia M Harrington
(74) *Attorney, Agent, or Firm* — Canon U.S.A., Inc. IP Division

(57) ABSTRACT

A driving apparatus performs driving of an object. The apparatus includes a driving device for the driving; a position detector, and a controller. The position detector is configured to detect the position of the object. The controller is configured to generate a first signal for open-loop control of the driving device based on a target velocity of the object, generate a second signal for closed-loop control of the driving device based on the detected position and a target position of the object, and generate a driving signal for the driving device based on at least one of the first signal and the second signal. The controller is further configured to perform weighted summing of the first signal and the second signal to generate the driving signal based on inversion between positive and negative of load for the driving device.

15 Claims, 11 Drawing Sheets

DRIVING APPARATUS, OPTICAL APPARATUS, SYSTEM, IMAGE PICKUP APPARATUS, AND LENS APPARATUS

BACKGROUND OF THE INVENTION

Field of the Invention

One disclosed aspect of the embodiments relates to a driving apparatus, an optical apparatus, a system, an image pickup apparatus, and a lens apparatus having stability of control under inversion between positive and negative of load.

Description of the Related Art

Japanese Patent Application Laid-Open No. 2006-189506 discloses an imaging apparatus (a camera) which detects the posture of the imaging apparatus with a posture sensor and increases or reduces the output torque of a stepping motor for moving an imaging lens depending on whether the imaging apparatus is inclined or horizontal. In a zoom lens apparatus for broadcasting, for example, a lens unit that moves for zooming is made of glass and is large in mass. The lens unit is driven with a cam of a complicated shape in many cases (the amount of movement of the lens unit changes non-monotonically with rotation of a cam cylinder in one direction, for example). In such a lens apparatus, the driving torque greatly varies depending on the posture thereof. The disclosure of Japanese Patent Application Laid-Open No. 2006-189506 just increases or reduces the output torque of the stepping motor depending on whether the imaging apparatus is inclined or horizontal.

SUMMARY OF THE INVENTION

The present disclosure provides, for example, a driving apparatus advantageous in stability of control under inversion between positive and negative of load for a driving device included therein.

An aspect of the embodiments is a driving apparatus that performs driving of an object. The driving apparatus includes a driving device for the driving, a position detector, and a controller. The position detector is configured to detect the position of the object. The controller is configured to generate a first signal for open-loop control of the driving device based on a target velocity of the object. The controller is further configured to generate a second signal for closed-loop control of the driving device based on the detected position and a target position of the object. The controller is further configured to generate a driving signal for the driving device based on at least one of the first signal and the second signal. The controller is configured to perform weighted summing of the first signal and the second signal based on inversion between positive and negative of load for the driving device to generate the driving signal.

Further features of the disclosure will become apparent from the following description of exemplary embodiments with reference to the attached drawings.

DESCRIPTION OF THE EMBODIMENTS

Figure 1:
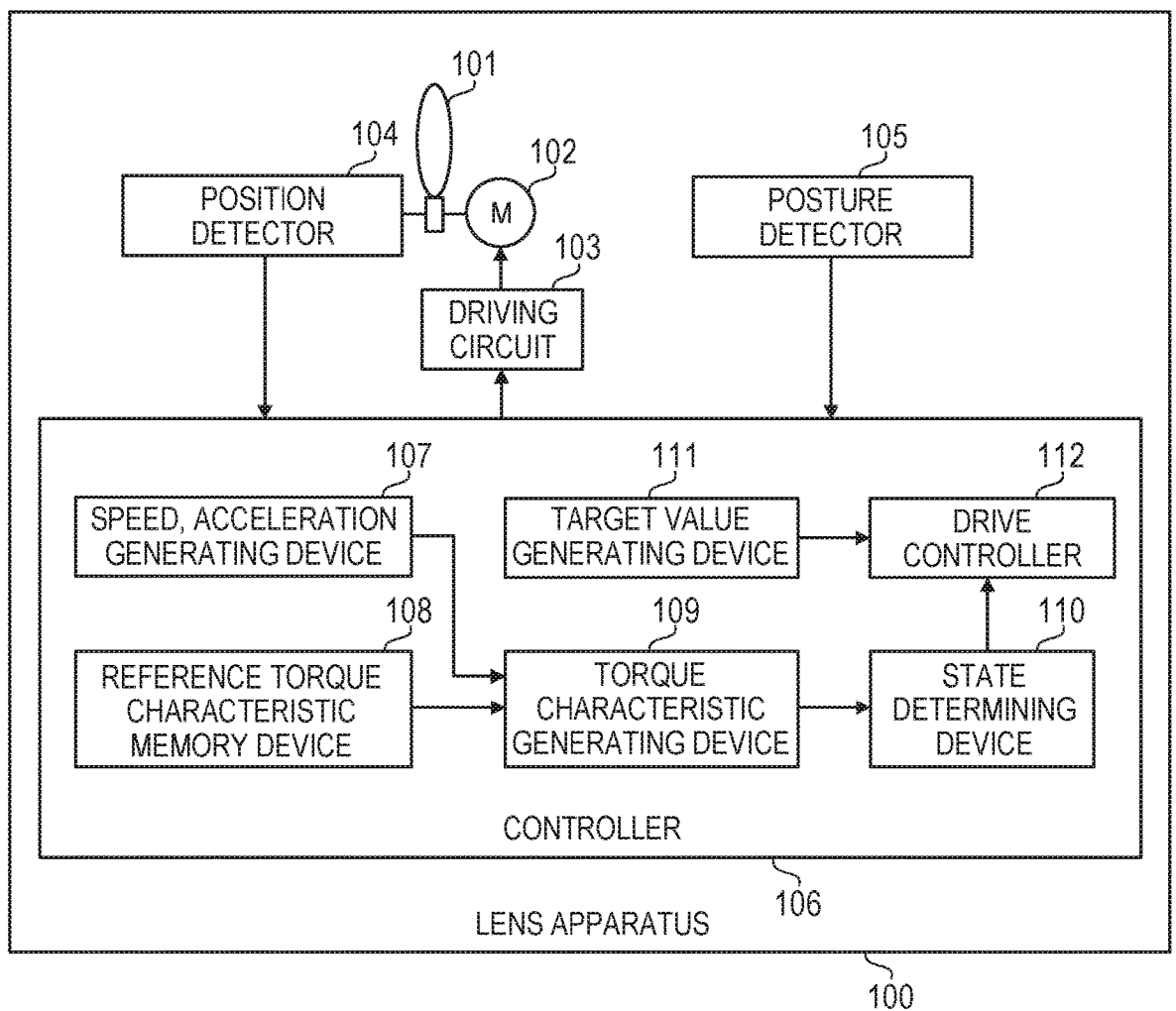
FIG. 1 is a diagram illustrating a configuration example of a driving apparatus according to Embodiment 1.

Hereinafter, a description is given of embodiments of the disclosure with reference to the attached drawings. The same members are given the same reference numerals in principle (unless otherwise noted) throughout the drawings illustrating the embodiments, and repeated description thereof is omitted.

The prior art technique does not consider variation in load (load torque) during movement of the imaging lens, especially inversion between positive and negative of load. Accordingly, in the prior art technique, when the lens unit (an optical member) is located at the position where inversion between positive and negative of load occurs, feedback control on the lens unit may cause an instantaneous mismatch between the target value and the amount of control due to backlash of the gears transmitting force (torque) and thereby oscillates the lens unit.

Embodiment 1

FIG. 1 is a diagram illustrating a configuration example of a driving apparatus according to Embodiment 1. The driving apparatus constitutes a lens apparatus 100. The lens apparatus 100 includes a lens unit 101 (an optical member as a drive object), a motor 102, a driving circuit 103, a position detecting device 104, a posture detector 105, and a controller 106. The lens unit 101 is a movable one of plural optical members included in the lens apparatus 100. The lens unit 101 moves in the direction of the optical axis thereof by rotation of a cam member (a cam cylinder). The lens apparatus 100 forms an optical image on an image pickup element (not illustrated). The lens unit 101 can be a lens unit that moves for zooming or focusing, for example. The lens unit 101 can include plural lens units that move in different ways and can include a lens unit that moves non-monotonically. A non-monotonical movement is a movement that does not always follow the same direction. For example, a lens unit may move to the right and to the left. The lens unit 101 can also include an optical member (an aperture stop, for example) different from lens units. The lens unit 101 moves in the direction of the optical axis with the motor 102 driven by the driving circuit 103. The position of the lens unit 101 is detected by the position detecting device 104. The posture detector 105 detects the posture (an angle of the optical axis to the horizontal plane, for example) of the lens apparatus 100 (lens unit 101).

The controller 106 can be configured by including a central processing unit (CPU) or a microcomputer. In FIG. 1, however, the controller 106 is represented as a collection of functional blocks (devices). The controller 106 includes a speed (velocity) and acceleration generating device 107, a reference torque characteristic memory device 108, a torque characteristic generating device 109, a state determining device 110, a target value generating device 111, and a drive controller 112. The speed and acceleration generating device 107 generates speed and acceleration of the lens unit 101. The reference torque characteristic memory device 108 stores a reference torque characteristic representing the relationship between the position of the lens unit 101 and load torque in the state where the lens apparatus 100 takes a specific posture (the angle of the optical axis to the horizontal plane is 90 degrees, for example). The torque characteristic generating device 109 generates a torque characteristic representing the relationship between the position of the lens unit 101 and load torque in the current state, based on the reference torque characteristic, the posture of the lens apparatus 100, and the speed and acceleration of the lens unit 101. The state determining device 110 determines whether the lens unit 101 is in a first state range as described later. The target value generating device 111 generates a target position and a target speed of the lens unit 101. The drive controller 112 generates an instruction value for the driving circuit 103 based on the position, target position, and target speed of the lens unit 101 and the state determined by the state determining device 110. The lens apparatus 100 is connected to a camera apparatus (an image pickup apparatus body) including an image pickup element, not illustrated herein, to constitute an image pickup apparatus. The image pickup apparatus receives light from the lens apparatus 100 with the image pickup element to generate image information concerning a moving or still image.

Figure 2:
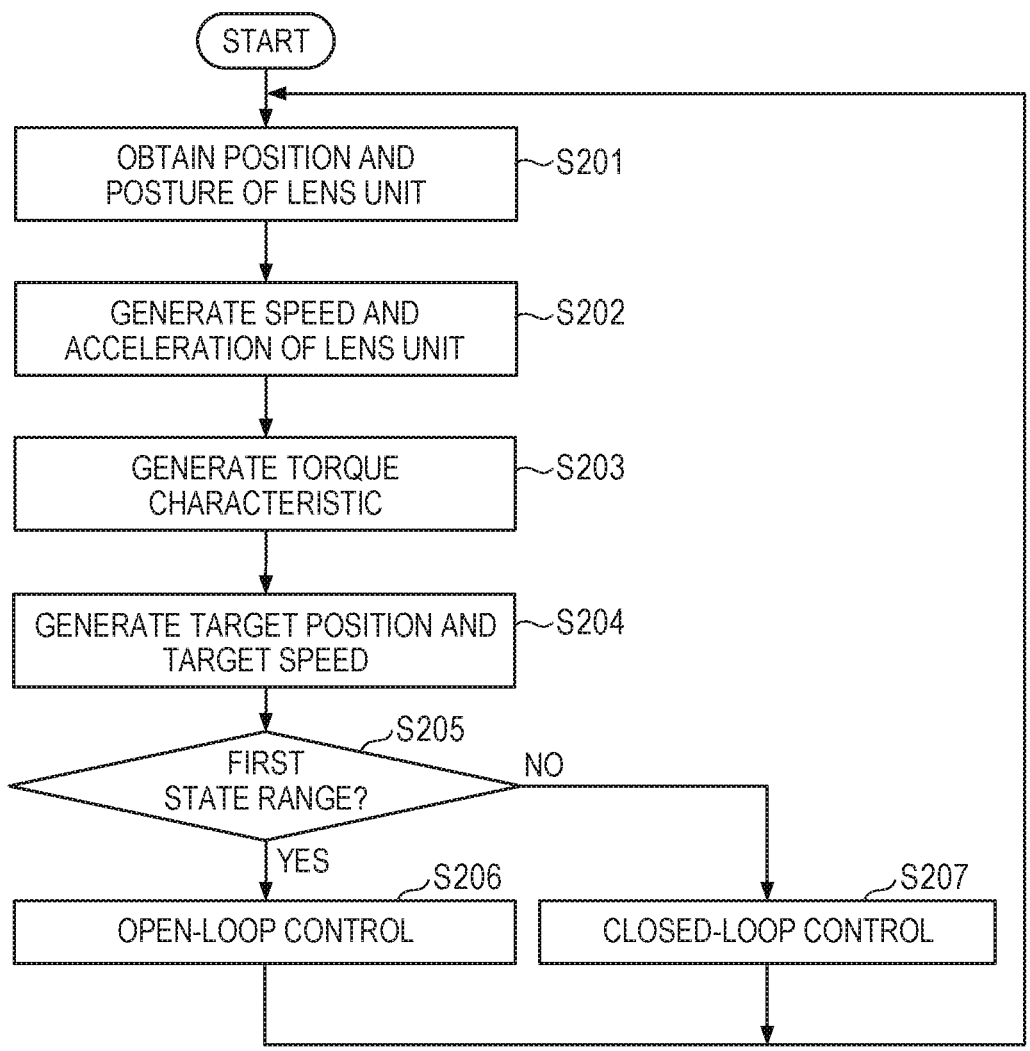
FIG. 2 is a diagram illustrating a processing flow of a controller.
Figure 3A:
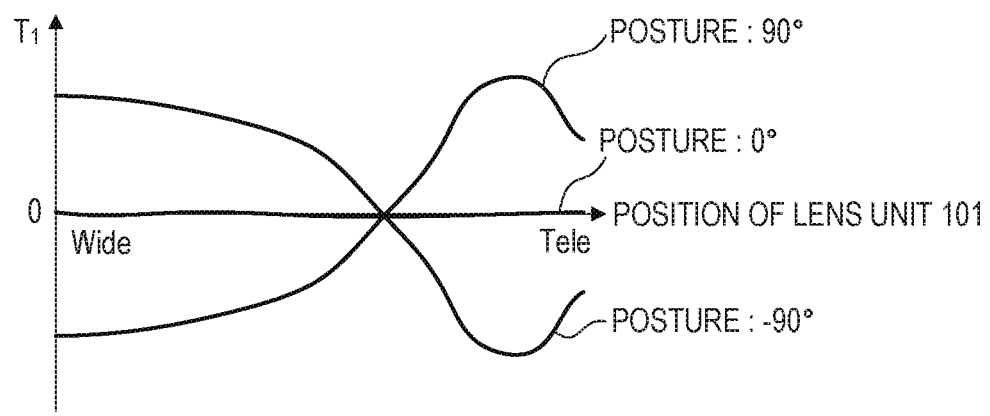
FIGS. 3A and 3B are diagrams illustrating relationships (reference torque characteristics) between the lens position and load torque.
Figure 3B:
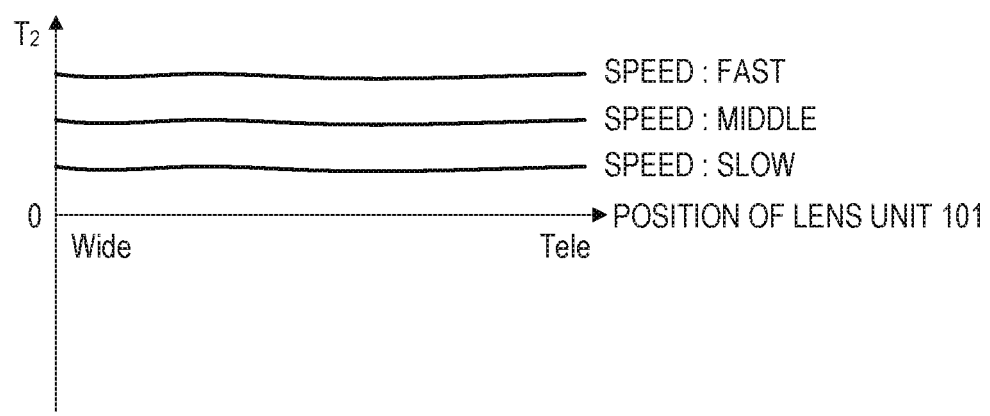
Figure 4A:
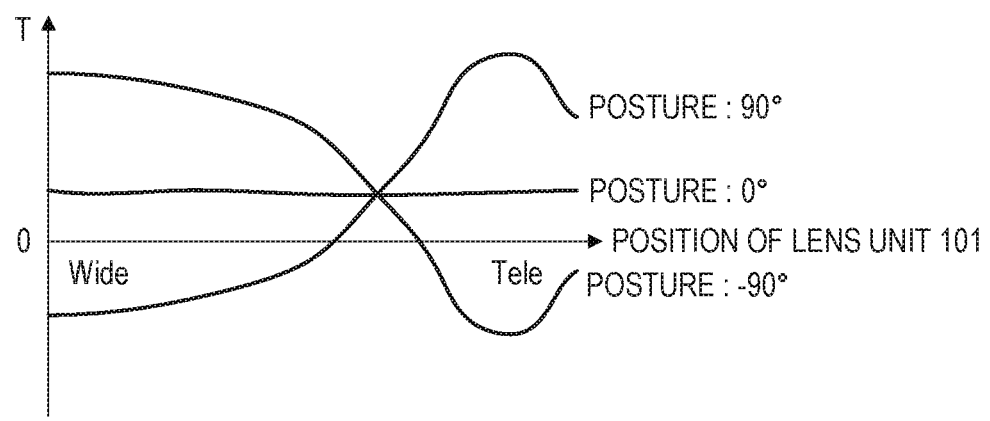
FIGS. 4A and 4B are diagrams illustrating relationships (actual torque characteristics) between the lens position and load torque.
Figure 4B:
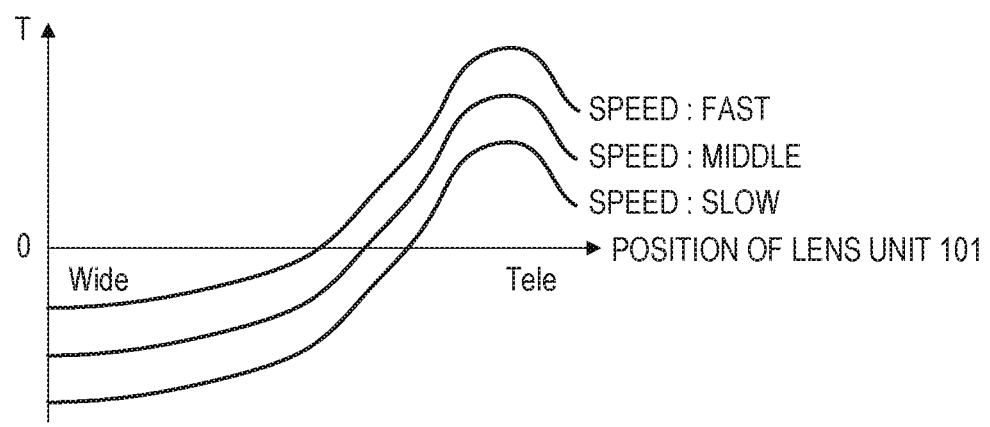
Figure 5:
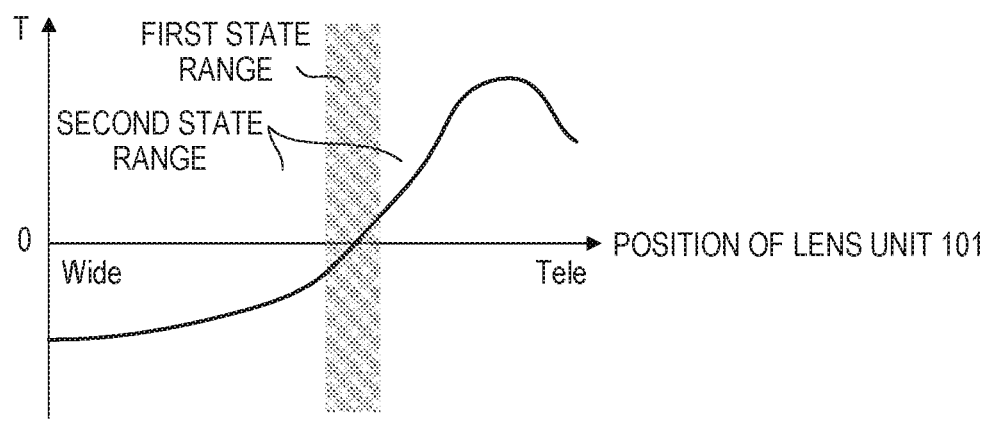
FIG. 5 is a diagram illustrating a first state range and a second state range.
Figure 6:
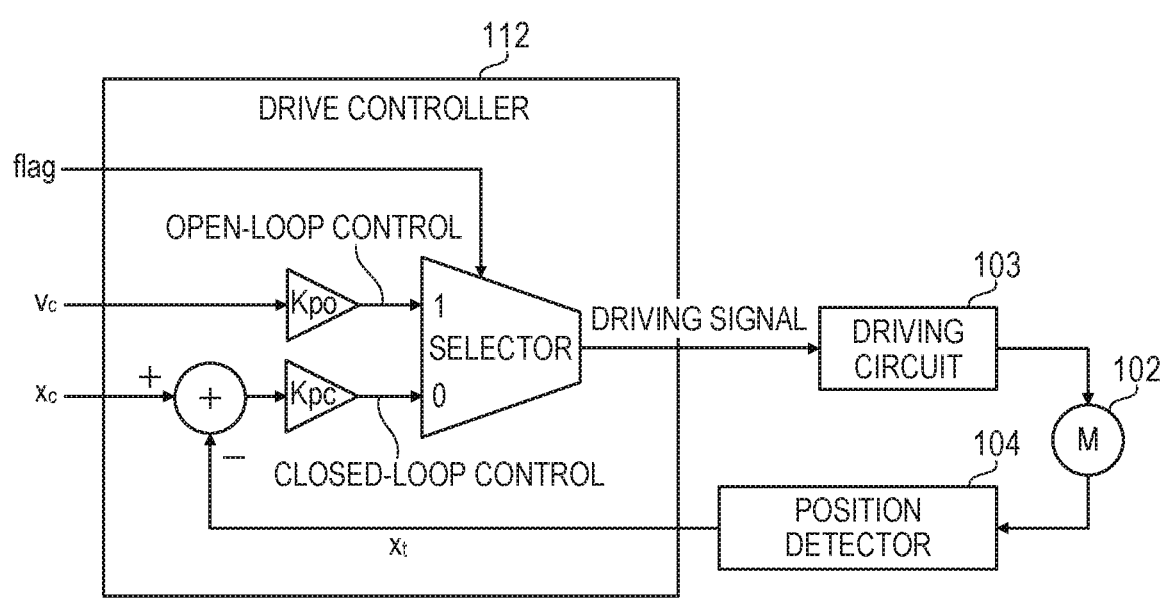
FIG. 6 is a diagram illustrating a configuration example of a drive controller.

Herein, FIG. 2 is a diagram illustrating a processing flow of a controller. FIGS. 3A and 3B are diagrams illustrating relationships (reference torque characteristics) between the lens position and load torque. FIGS. 4A and 4B are diagrams illustrating relationships (actual torque characteristics (or torque characteristic at each state)) between the lens position and load torque. FIG. 5 is a diagram illustrating the first state range and a second state range. FIG. 6 is a diagram illustrating a configuration example of a drive controller. Hereinafter, a description is given of a processing flow of the controller of Embodiment 1 with reference to FIGS. 2 to 6.

In FIG. 2, in step S201, the controller 106 obtains a current position $x_t$ of the lens unit 101 from the position detecting unit 104 and obtains a current posture $\theta_t$ of the lens unit 101 with respect to the horizontal plane, from the posture detector 105. In step S202, the speed and acceleration generating device 107 generates speed $v_t$ and acceleration $\alpha_t$ of the lens unit 101 based on the following Equations (1) and (2).

$$v_t = x_t - x_{t-1} \quad (1)$$

$$\alpha_t = v_t - v_{t-1} \quad (2)$$

Herein, $x_{t-1}$ and $v_{t-1}$ are the previous (one sampling period before) position and speed of the lens unit 101, respectively. In Embodiment 1, the speed and acceleration are generated by Equations (1) and (2), respectively, but the way of generating the speed and acceleration is not limited thereto. The speed and acceleration may be generated by different equations or may be measured using a sensor. In subsequent step S203, the torque characteristic generating device 109 reads the reference torque characteristic representing the relationship between the position of the lens unit 101 and the load torque $T_1$ from the reference torque characteristic memory device 108. The torque characteristic generating device 109 then generates (or estimates) actual torque characteristic (actual torque characteristic or torque characteristic in each state) representing the relationship between the position of the lens unit 101 and the load torque T. The relationship is expressed by Equation (3) below.

$$T(x,\theta,v,\alpha) = T_1(x,\theta) + T_2(v,\alpha) \quad (3)$$

Herein, x is the position of the lens unit 101; θ, the posture of the lens unit 101 (the lens apparatus 100); v, the speed of the lens unit 101; and α, the acceleration of the lens unit 101. $T_1$ is a torque component to move the lens unit 101 against the weight of the lens unit 101. $T_2$ is a torque component varying on the speed and acceleration of the lens unit 101.

FIGS. 3A and 3B illustrate the relationship between the position of the lens unit 101 and the torque $T_1$ and the relationship between the position of the lens unit 101 and the torque $T_2$, respectively. $T_1$ is a reference torque characteristic component obtained by inverting the sign of the total sum of the weight component of each lens constituting the lens unit 101 in the optical axis direction. $T_1$ can be determined by the shape of the cam moving the lens unit 101 as illustrated in FIG. 3A. The values of $T_1$ for postures of θ and −θ have the same absolute value but have opposite signs. When a reference torque characteristic $T_{tb1}$, which represents the relationship between the position of the lens unit 101 and the torque $T_1$ for the posture of 90 degrees, is stored, for example, multiplying $T_{tb1}$ by sin θ (−90 degrees≤θ≤90 degrees) gives a value of $T_1$ at a certain posture θ. $T_2$ is a torque characteristic component depending on the driving system. $T_2$ is expressed by a function f(v, α) of the speed v and acceleration α of the lens unit 101 as variables. FIG. 3B illustrates f(v, α)=kv (k is a constant). The reference torque characteristic T is therefore expressed by Equation (4). In the step S203, the torque characteristic generating device 109 generates the (real) torque characteristic based on Equation (4) below.

$$T(x,\theta,v,\alpha) = T_{tb1}(x) \cdot \sin\theta + f(v,\alpha) \quad (4)$$

FIGS. 4A and 4B illustrate actual torque characteristics varying on the posture and speed of the lens unit 101. FIG. 4A illustrates an actual torque characteristic for each posture (posture: 90 degrees, 0 degrees, −90 degrees) of the lens unit 101 when the lens unit 101 moves at a predetermined speed (speed: slow). FIG. 4B illustrates an actual torque characteristic for each speed (speed: slow, middle, fast) of the lens unit 101 when the lens unit 101 takes a predetermined posture (90 degrees). As illustrated in FIGS. 4A and 4B, the position of the lens unit 101 where inversion between positive and negative of load torque occurs, varies on the posture and speed of the lens unit 101. When the lens unit 101 is at the position, gears constituting a transmission structure that transmits torque can be disengaged because of backlash thereof. Performing feedback control (closed-loop control, closed control) for the lens unit 101 in such a state produces mismatch between the target position and the amount of control, which could cause oscillation in the controlling system.

In Embodiment 1, therefore, as illustrated in FIG. 5, a predetermined state range including the state of the lens unit 101 where inversion between positive and negative of load torque T occurs is set as the first state range, and the range outside thereof is set as a second state range. The control for the lens unit 101 is switched depending on the state range. Width w of the first state range is preferably adjusted in advance in controlling of the lens unit 101 performing at least one of open-loop control (open control) and closed-loop control described later. The adjustment can be performed through measurement so as to adequately provide both effects of lens positioning accuracy by closed-loop control and stability of control by open-loop control. The width w is set variable when varying the width w according to the inclination of the torque characteristic is desired in terms of the aforementioned both effects.

In subsequent step S204, the target value generating device 111 generates a target position $x_c$ and a target speed $v_c$ of the lens unit 101 based on the current position $x_t$ of the lens unit 101 detected by the position detecting device 104. In step S205, the state determining device 110 generates by Equation (5) below, a flag signal 'flag' representing whether the lens unit 101 is in the first state range based on the current position $x_t$ of the lens unit 101, the torque characteristic generated by the torque characteristic generating device 109, and the width w of the first state range.

$$\text{flag} = \begin{cases} 1 & \left(\text{when } |x_t - x_*| \leq \frac{w}{2}\right) \\ 0 & \left(\text{when } |x_t - x_*| > \frac{w}{2}\right) \end{cases} \quad (5)$$

Herein, x* is the closest position to the current position $x_t$ among the position of at least one lens unit 101 where inversion between positive and negative of load torque T occurs. When the lens unit 101 is in the first state range, the flag signal 'flag' is set to 1, and otherwise, (when the lens unit 101 is in the second state range), the flag signal 'flag' is set to 0. In step S205, when it is determined that the lens unit 101 is in the first state range (flag=1), the process proceeds to step S206, and otherwise (when it is determined that the lens unit 101 is in the second state range (flag=0)), the process proceeds to step S207. In the step S206, the later-described open-loop control is performed. In the step S207, the later-described closed-loop control is performed. In the configuration example of the drive controller of FIG. 6, the closed-loop control is advantageous in terms of accuracy in positioning of the lens unit 101 because the closed-loop control feeds back the current position (amount of control) of the lens unit 101 to generate a driving signal for the driving circuit. As described above, however, control can be unstable (can oscillate) when the lens unit 101 is located at the position where inversion between positive and negative of load torque occurs. Compared with the closed-loop control (feedback control), the open-loop control is disadvantageous in terms of the accuracy in positioning of the lens unit 101 but is advantageous in terms of stability of control. The drive controller 112 receives the target position $x_c$ and target speed $v_c$ of the lens unit 101 from the target value generating device 111; receives the flag signal 'flag' from the state determining device 110; and receives the current position $x_t$ of the lens unit 101 from the position detecting device 104. When the flag signal 'flag' is 1, the drive controller 112 outputs to the driving circuit 103, a driving signal obtained by multiplying the target speed $v_c$ by a proportional gain Kpo. When the flag signal 'flag' is 0, the drive controller 112 outputs to the driving circuit 103, a driving signal obtained by multiplying a deviation $(x_c - x_t)$ between the target position $x_c$ and current position $x_t$ by a proportional gain Kpc. The open-loop control and closed-loop control are switched through a selector based on the flag signal 'flag'. Herein, the closed-loop control is P (proportional) control. However, the closed-loop control may be another control such as PID (proportional-integral-differential) control. After the process in the step S206 or S207, the process from the step S201 is repeated. The process is terminated when a not-illustrated termination condition is satisfied.

As described above, the first signal for the open-loop control and the second signal for the closed-loop control are weighted based on inversion between positive and negative of load (torque) for a driving device to generate a driving signal for the driving device. In Embodiment 1, the weights for the first and second signals are 1 or 0. When one of the weights is 1, the other weight is 0. In other words, a controller generates the driving signal by selecting the first signal is selected when the lens unit 101 is in the predetermined first state range including the state where inversion between positive and negative of load is to occur. The controller generates the driving signal by selecting the second signal when the lens unit 101 is in the second state range, which is outside of the first state range. According to Embodiment 1, for example, it is possible to provide driving apparatuses advantageous in terms of stability of control under inversion between positive and negative of load, for example.

Embodiment 2

In Embodiment 1, when the lens unit 101 is in the first state range, the first signal for the open-loop control is selected as the driving signal, and when the lens unit 101 is in the second state range, the second signal for the closed-loop control is selected as the driving signal. In other words, one of the weights for the first and second signals is set to 1 when the other weight is set to 0. In such a configuration, the control method is suddenly switched at the boundary between the first and second state ranges. Such switching can influence images taken using the lens apparatus 100 and may create undesirable effects. In Embodiment 2, switching the control method is smoothly performed to reduce the undesirable effects.

Figure 7:
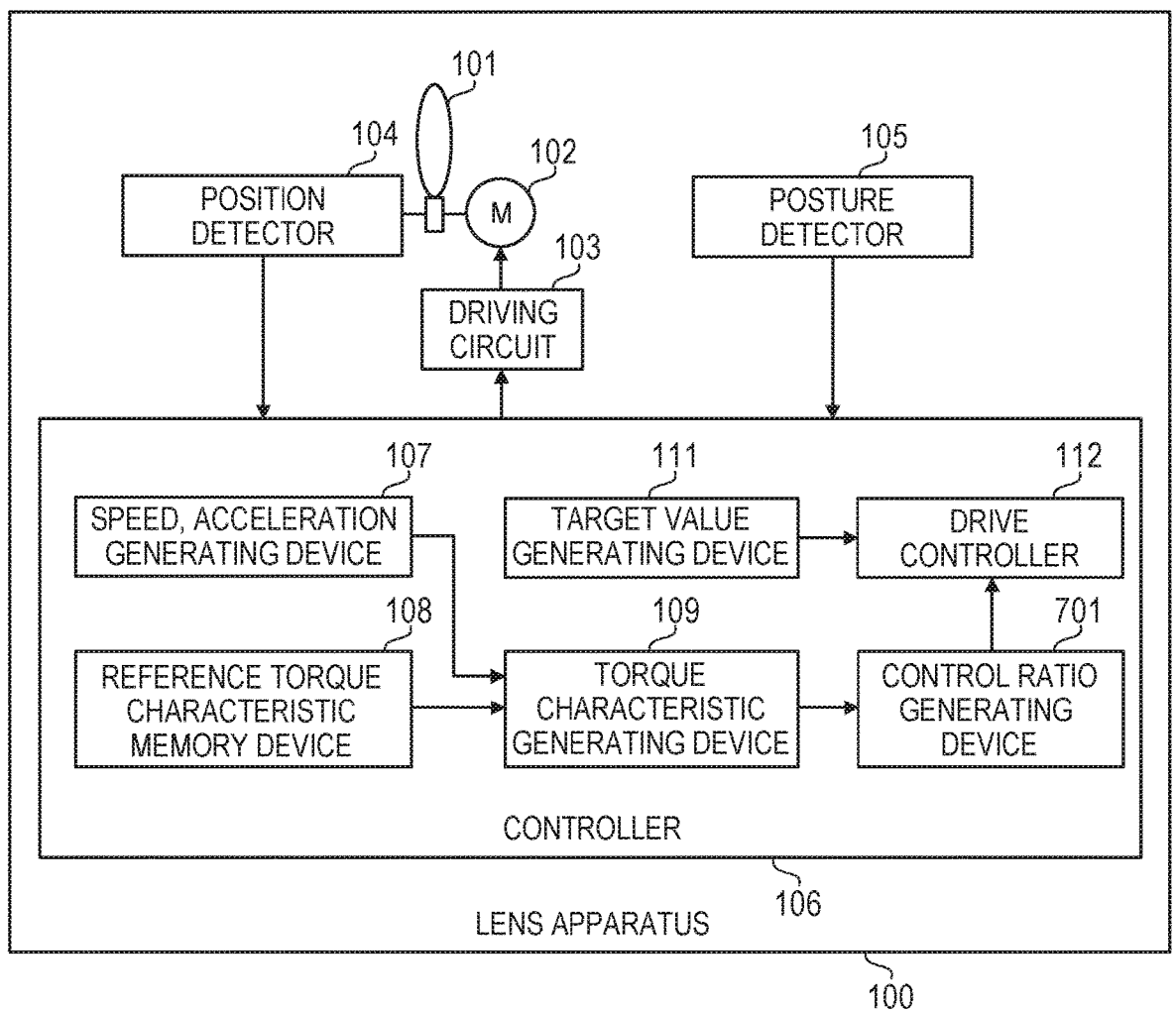
FIG. 7 is a diagram illustrating a configuration example of a driving apparatus according to Embodiment 2.

FIG. 7 is a diagram illustrating a configuration example of a driving apparatus of Embodiment 2. The driving apparatus of Embodiment 2 is different from that of Embodiment 1 in including a control ratio generating device 701 instead of the state determining device 110 in FIG. 1. The control ratio generating device 701 generates a control ratio signal based on the distance between the current position of the lens unit 101 and the position of the lens unit 101 where inversion between positive and negative of torque occurs. The control ratio generating device 701 then outputs the generated control ratio signal to the drive controller 112.

Figure 8:
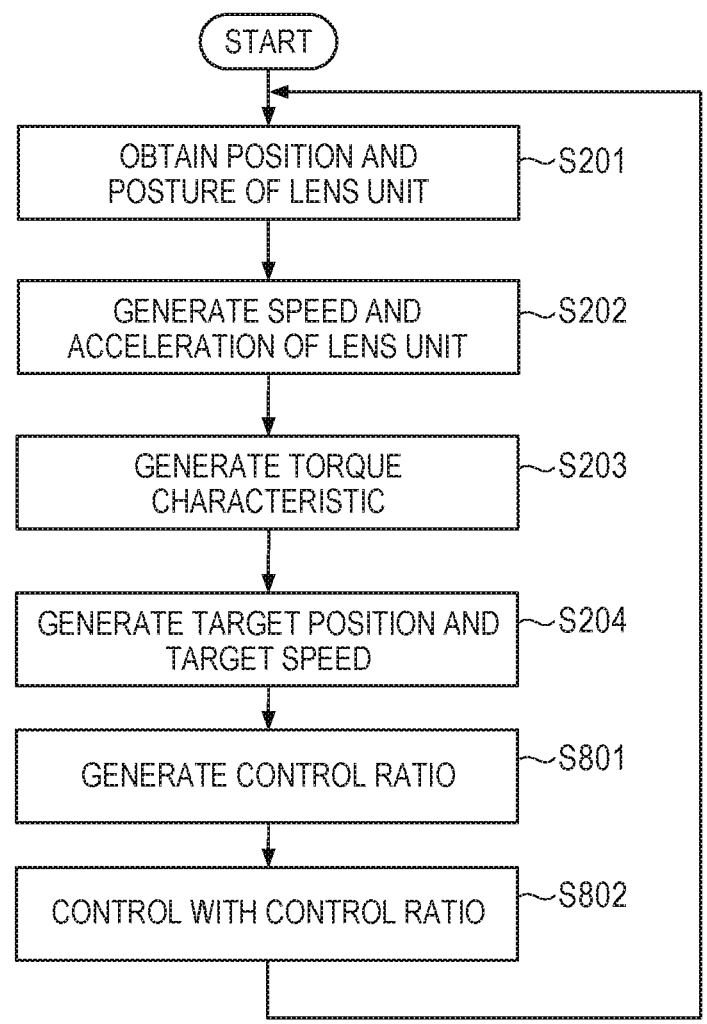
FIG. 8 is a diagram illustrating a processing flow of a controller.
Figure 9:
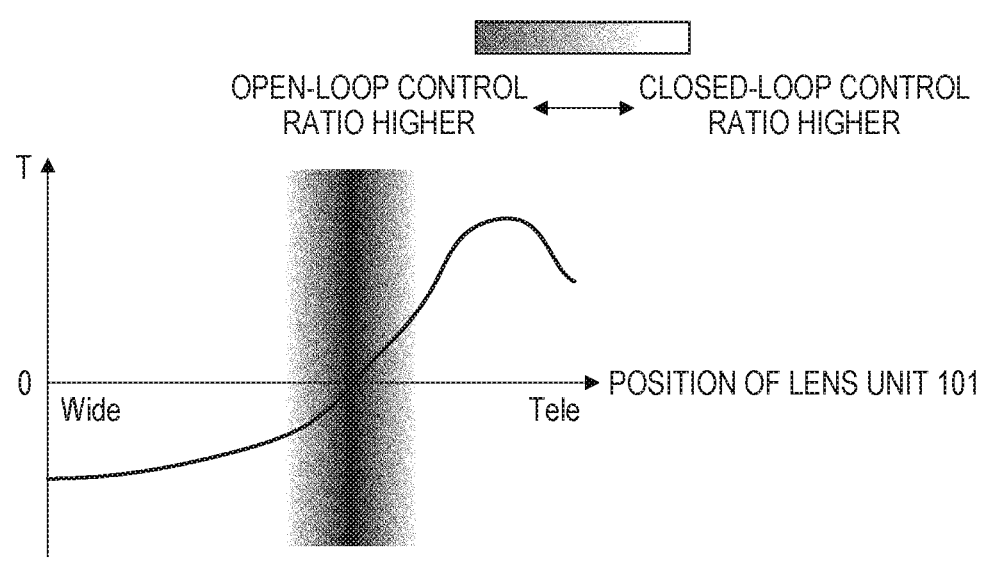
FIG. 9 is a diagram illustrating a weight for open-loop control and a weight for closed-loop control.
Figure 10:
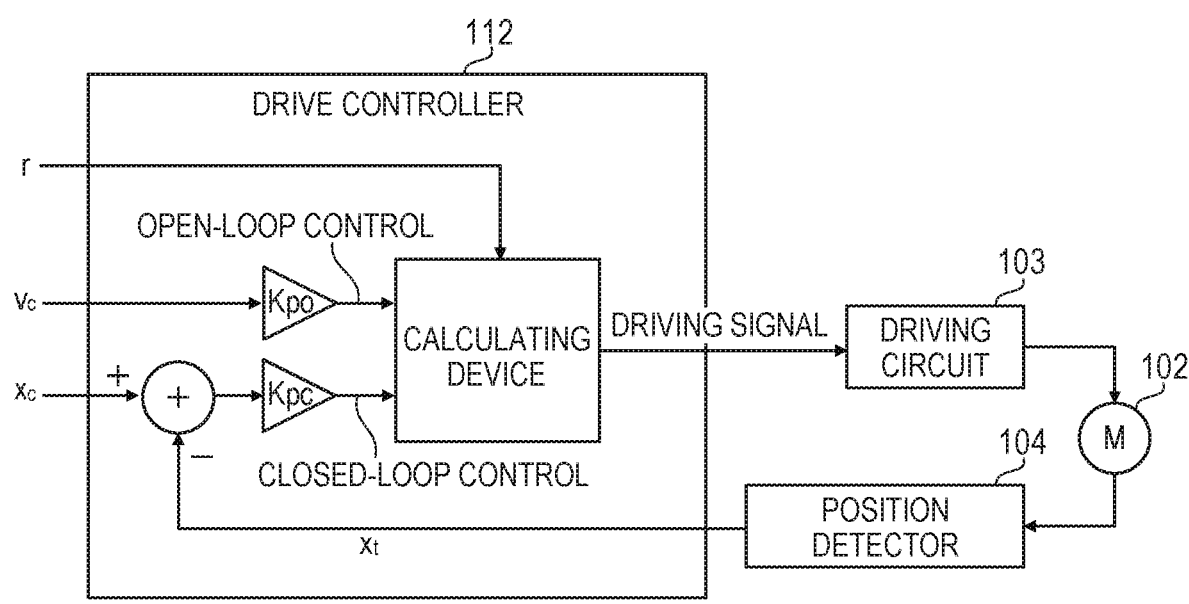
FIG. 10 is a diagram illustrating a configuration example of a drive controller.

FIG. 8 is a diagram illustrating a processing flow of the controller. FIG. 9 is a diagram illustrating weights for open-loop control and closed-loop control. FIG. 10 is a diagram illustrating a configuration example of a drive controller. Hereinafter, Embodiment 2 is described with reference to FIGS. 8 to 10. In FIG. 8, steps S201 to S204 are the same as those according to Embodiment 1 in FIG. 2. In subsequent S801, the control ratio generating device 701 generates a control ratio signal r (0≤r≤1) by Equation (6) below, based on the current position $x_t$ of the lens unit 101 obtained in the step S201 and the actual torque characteristic generated in the step S203.

$$r = \begin{cases} \gamma|x_t - x_*| & (\gamma|x_t - x_*| < 1) \\ 1 & (\gamma|x_t - x_*| \geq 1) \end{cases} \quad (6)$$

Herein, x* is the closest position to the current position $x_t$ among the position of at least one lens unit 101 where inversion between positive and negative of load torque T occurs. γ (0<γ) is a weight for the closed-loop control. γ may be constant or may be variable depending on the inclination of the load torque characteristic or the like. γ may be a function of $x_t$ so as to vary on the position of the lens unit 101. Although Equation (6) is a linear expression of $x_t$, Equation (6) can be an expression based on any distance between $x_t$ and x* and may be a quadratic expression of $x_t$. The smaller the control ratio signal r, the larger the weight of the open-loop control. The larger the control ratio signal r, the larger the weight of the closed-loop control. As illustrated in FIG. 9, in the control ratio signal r, the weight of the open-loop control increases as the position of the lens unit 101 gets close to the position of the lens unit 101 at which inversion between positive and negative of the torque T occurs. On the other hand, in the control ratio signal r, the weight of the closed-loop control increases as the position of the lens unit 101 gets away from the position of the lens unit 101 where inversion between positive and negative of the torque T occurs. In FIG. 10, the drive controller 112 receives the target position $x_c$ and target speed $v_c$ of the lens unit 101 from the target value generating device 111, the control ratio signal r from the control ratio generating device 111, and the current position $x_t$ of the lens unit 101 from the position detecting device 104. The drive controller 112 receives the control ratio signal r instead of the flag signal 'flag' unlike Embodiment 1. The drive controller 112 includes a calculating device instead of the selector. The calculating device generates a driving signal y for the driving circuit 103 by Equation (7) below and outputs the driving signal y to the driving circuit 103. In the step S802, control of the lens unit 101 is executed using the control ratio signal r.

$$y = (1-r)y_o + ry_c \quad (7)$$

Herein, $y_o$ is a first signal for open-loop control while $y_c$ is a second signal for closed-loop control. The driving signal y is generated based on a sum of a signal obtained by weighting the first signal $y_o$ with a first weight 1−r based on the distance of the current state from the state where the inversion between positive and negative of load (torque) for the driving device is to occur and a signal obtained by weighting the second signal $y_c$ with a second weight r based on the distance. In a case where the distance is not smaller than a threshold (not smaller than 1/γ), the first weight is set to 0 while the second weight is set to 1. This enables smooth transition of control between open-loop control and closed-loop control. This reduces the undesirable effects caused by switching of control that can appear in images taken using the lens apparatus 100.

As described above, according to Embodiment 2, it is possible to provide a driving apparatus which is advantageous in terms of stability of control under inversion between positive and negative of load, for example. In Embodiment 2, the ratio of open-loop control to closed-loop control is variable. However, the disclosure is not limited to such a configuration, and the same or similar effect may be obtained by varying a transfer function (various gains in PID control, for example) of the drive controller in the closed-loop control, based on the distance of the current state from the state where inversion between positive and negative of load is to occur.

(Embodiments Concerning Image Pickup Apparatus and Other Apparatus)

Figure 11:
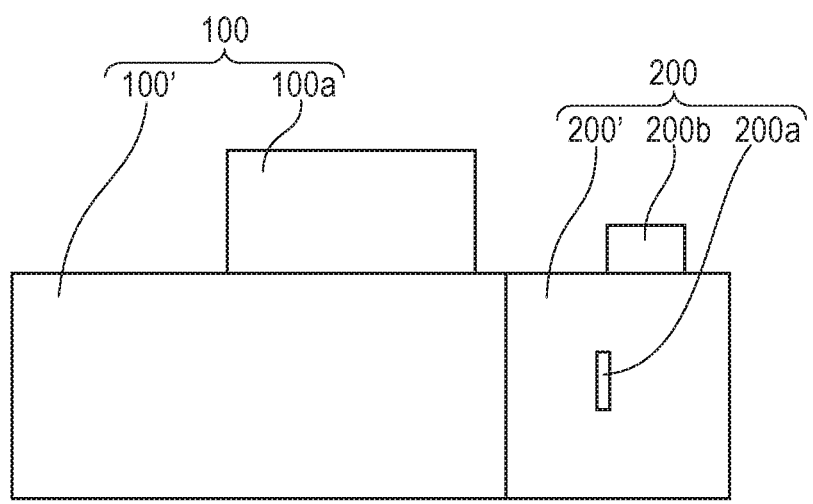
FIG. 11 is a diagram illustrating a configuration example of an image pickup apparatus.

FIG. 11 is a diagram illustrating a configuration example of an image pickup apparatus. The image pickup apparatus includes the lens apparatus (driving apparatus) 100 illustrated above and a camera apparatus (an image pickup device or an image pickup apparatus body) 200 including an image pickup element 200a provided on an image surface of the lens apparatus 100. The lens apparatus 100 can include a unit 100a, which includes an operation member and a CPU (a processing device) for the lens apparatus 100, as a subunit (an operation apparatus or a drive device) of the lens apparatus 100. The subunit may be configured so as to be spatially separable from a lens apparatus body 100'. In such a case, the subunit constitutes the operation apparatus (also referred to as a control apparatus or a demand) including the unit 100a that performs operation (control of drive) for a movable optical member included in the lens apparatus body 100'. Alternatively, the subunit constitutes the driving apparatus including the unit (drive device) 100a which drives the optical member. The drive device 100a can further include a motor, a driving circuit for the motor, and a detector that detects the state of the optical member. The camera apparatus 200 includes a function of transmitting an instruction value for the optical member. The instruction value can be generated by a (camera) operation apparatus 200b as a subunit of the camera apparatus 200, for example. Alternatively, the instruction value can be generated through an autofocusing function or an auto-iris function of the camera apparatus 200, for example. The operation apparatus 200b is configured to be separable from a camera apparatus body 200'. The operation apparatus 200b can communicate with the camera apparatus body 200' by wire or wirelessly. The operation apparatus 200b can generate at least one of the instruction value corresponding to an object distance of the lens apparatus, the instruction value corresponding to the focusing distance or zooming of the lens apparatus, the instruction value corresponding to an effective aperture of the lens apparatus, and the like. According to the embodiment, it is possible to provide image pickup apparatuses advantageous in terms of control of stability under inversion between positive and negative of load, for example. In addition to image pickup apparatuses, it is possible to provide various optical apparatuses (observation or measurement apparatuses and projection apparatuses, for example) including: the above-illustrated driving apparatus; and the movable optical member which is driven by the driving apparatus. Furthermore, it is possible to provide various systems (pan-tilt systems (for camera) or multiple viewpoint video systems, for example) including the above-illustrated driving apparatus and the lens apparatus including a movable optical member driven by the driving apparatus.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-069284, filed Mar. 30, 2018, which is hereby incorporated by reference herein in its entirety.

What is claimed is:

1. A driving apparatus that performs driving of an object, the apparatus comprising:

a driving device for the driving;
a position detector configured to detect a position of the object; and
a controller configured to generate a first signal for open-loop control of the driving device based on a target velocity of the object, generate a second signal for closed-loop control of the driving device based on the detected position and a target position of the object, and generate a driving signal for the driving device based on at least one of the first signal and the second signal,
wherein the controller is further configured to perform weighted summing of the first signal and the second signal to generate the driving signal based on inversion between positive and negative of load for the driving device in controlling of the driving device in one direction.

2. The driving apparatus according to claim 1, further comprising a posture detector configured to detect a posture of the driving apparatus,
wherein the controller is further configured to specify, based on the detected posture, a
state, where the inversion is to occur, of the apparatus.

3. The driving apparatus according to claim 1, wherein the controller is further configured to select, in a predetermined first state range including the state where the inversion is to occur, the first signal to generate the driving signal.

4. The driving apparatus according to claim 3, wherein the controller is further configured to select, in a second state range outside the first state range, the second signal to generate the driving signal.

5. The driving apparatus according to claim 1, wherein the controller is further configured to generate the driving signal based on a sum of a signal obtained by weighting the first signal with a first weight based on a distance of a state of the apparatus from the state where the inversion is to occur and a signal obtained by weighting the second signal with a second weight based on the distance.

6. The driving apparatus according to claim 5, wherein the controller is further configured to cause the first weight to be 0 and cause the second weight to be 1 in a case where the distance is not smaller than a threshold.

7. An optical apparatus comprising:
a driving apparatus defined in claim 1; and
a movable optical member of which the driving is performed by the driving apparatus.

8. A system comprising:
a driving apparatus defined in claim 1; and
a lens apparatus including a movable optical member of which the driving is performed by the driving apparatus.

9. An image pickup apparatus comprising:
the driving apparatus defined in claim 1;
a movable optical member of which the driving is performed by the driving apparatus; and
an image pickup element configured to receive light from the optical member.

10. A driving apparatus that performs driving of an object, the apparatus comprising:
a driving device for the driving;
a detector configured to detect a position of the object; and
a controller configured to generate a driving signal for closed-loop control of the driving device based on the detected position and a target position of the object,
wherein the controller is further configured to change a transfer function thereof based on inversion between positive and negative of load for the driving device in controlling of the driving device in one direction.

11. A lens apparatus comprising:
a movable optical member; and
a driving apparatus, defined in claim 10, that performs driving of the optical member.

12. A lens apparatus comprising:
a movable optical member; and
a driving apparatus that performs driving of the optical member, wherein the driving apparatus includes:
a driving device for the driving;
a position detector configured to detect a position of the object; and
a controller configured to generate a first signal for open-loop control of the driving device based on a target velocity of the object, generate a second signal for closed-loop control of the driving device based on the detected position and a target position of the object, and generate a driving signal for the driving device based on at least one of the first signal and the second signal,
wherein the controller is further configured to perform weighted summing of the first signal and the second signal to generate the driving signal based on inversion between positive and negative of load for the driving device in controlling of the driving device in one direction.

13. The lens apparatus according to claim 12, wherein the controller is configured to generate information representing relation between a position of the optical member and the load.

14. The lens apparatus according to claim 13, wherein the controller is configured to generate the information based on a posture of the lens apparatus.

15. The lens apparatus according to claim 13, wherein the controller is configured to generate the information based on at least one of velocity and acceleration of the optical member.

* * * * *